017# United States Patent [19]

Hank et al.

[11] Patent Number: 4,629,902
[45] Date of Patent: Dec. 16, 1986

[54] DEVICE FOR MEASURING WEB TENSION

[75] Inventors: Dietrich Hank; Kerstin Hauer; Friedrich Richter, all of Leipzig, German Democratic Rep.

[73] Assignee: Veb Kombinant Polygraph "Werner Lamberz" Leipzig, Leipzig, German Democratic Rep.

[21] Appl. No.: 724,785

[22] Filed: Apr. 18, 1985

[30] Foreign Application Priority Data

Aug. 20, 1984 [DD] German Democratic Rep. ... 266415

[51] Int. Cl.⁴ ............................ G01V 9/04; G01L 5/04
[52] U.S. Cl. ..................................... 250/559; 250/224; 250/561; 73/862.39
[58] Field of Search ............... 250/224, 559, 561, 571; 73/159, 862.39

[56] References Cited

U.S. PATENT DOCUMENTS 4,496,428 1/1985 Wells .............................. 250/561 X Primary Examiner—Eugene R. LaRoche
Assistant Examiner—Robert J. Pascal
Attorney, Agent, or Firm—Michael J. Striker

[57] ABSTRACT

A device for measuring web tension of a continually movable web transported on a rotated cylindrical roller of a printing machine includes two eccentrics connected to two ends of the roller for supporting the latter for rotation and each includng a supporting pin. The supporting pin of one of the eccentrics has its end rigidly connected to a machine frame and is able to twist proportionally to the web tension. A lever having one end rigidly connected to the twistable supporting pin has its other end positioned between a light transmitter and a light detector of an optoelectronic sensor which detects the amount of twisting of the supporting pin.

5 Claims, 2 Drawing Figures

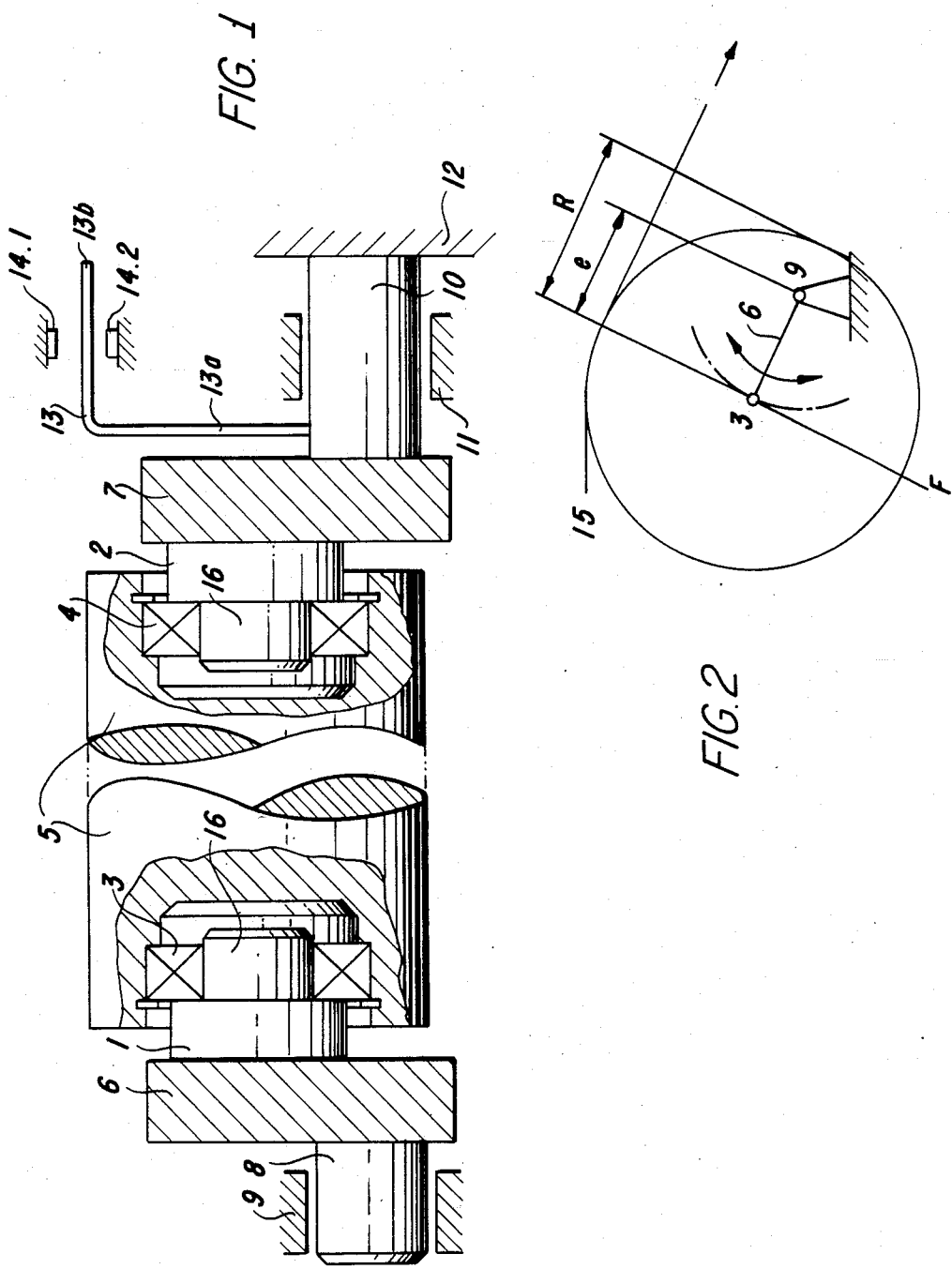

DEVICE FOR MEASURING WEB TENSION

BACKGROUND OF THE INVENTION

The present invention relates to a device for measuring web tension of a continually transported material web.

The measuring device of the invention is particularly suitable for use in roller rotary printing machines in which paper web is continually moved and its movement is recorded. Automatic control, regulating, examining or scanning devices mounted in connection with the web transporting device are normally required for this purpose.

It has been known that web tension is normally measured directly or indirectly by electric means, and the devices for measuring web tension are engaged with a movable element applied to the outer face of the transported web. The devices measure a path deflection of the web wrapped about the roller which is a so-called compensating or oscillating roller. Such a device has been disclosed, for example in DE-PS No. 2,356,009.

The chief disadvantage of the known devices resides in that the functional position of the rollers changes, and relatively great changes in the lengths of the web paths between two printing devices, for example printing mechanisms, result. Register errors that occur in the roller rotary printing machines are too great for register control devices. A further disadvantage of the known measuring device is its relatively great inertia which prevents high frequency web tension changes, which are connected with web breaks occurring with alternating amplitude, from being detected.

Disadvantageous also is backfeeding of this known measuring device as well as costs of roller lever means causing backfeeding (weight, springs) and means for additional loading and unloading.

Furthermore there are known measuring devices in which web tension is detected by means of force-value detecting gages positioned at two sides of the web guiding roller, these gages being semi-conductor strain gages. Such a measuring device has been disclosed in DE-PS No. 2,211,598. A bending torque exerted on the roller due to the web tension and web wrapping is used and pressure and pulling forces resulting from this torque in both bearings are measured. An amount of an elastic deformation of a transverse beam or a bearing element, which occurs due to a position change of the roller, is measured by strain gages attached to the transverse beam or the bearing element, respectively.

The disadvantage of the conventional force-measuring devices is that these devices are very expensive because they include costly electronic equipment, power supply devices, aligning or adjusting apparatus, measurement transformers, loading arrangements provided for example with Wheatstone bridges and strain gages glued to steel members, these loading arrangements leading to high failure rate caused by the loading of the glue connections.

A further disadvantage of the force-measuring conventional device resides in the necessity of the measurement of forces in the two bearings of the web guiding roller. This method requires two measuring pick-ups and additionally an electronic device for the summation or the formation of a medium value resulting from the measurements in two roller bearings.

Also known are devices for measuring web tension in which elastic deformations of the connection means, for example supporting levers of the register roller pairs provided in the printing machine, are measured. Such a device has been disclosed in DD-PS No. 71 772. By means of a respective design of the connection means an extremely small but sensitive measuring device detects elastic deformations. For rigidly supported roller arrangements, for example web-guiding rollers, it has been suggested to measure elastic deformations of the elements supporting the roller bearing arrangement in the machine frame. The disadvantage of this method resides in that the bending torque on the roller should be measured and two measuring devices for the measurements in two roller bearings should be provided.

SUMMARY OF THE INVENTION

It is an object of the present invention to provide an improved device for measuring web tension of a continually transported material web.

It is another object of the invention to provide a device for measuring web tension of a continually movable paper web, which would be reliable in operation and inexpensive in manufacture.

It is still another object of the invention to provide a web tension measuring device which could be easily incorporated in existing systems of electronic process control of printing machines.

Yet another object of the present invention is to provide a web tension measuring device, in which the force generated by the web tension is measured by a device which is rigid, easy to assemble and is provided with a measurement pick-up which is very inexpensive.

These and other objects of this invention are attained by a device for measuring web tension of a continually transported material web engaged with and moved on an outer surface of a web guiding roller, comprising means for supporting said roller for rotation; and measuring means connected to said supporting means and measuring the web tension, said supporting means including two eccentrics positioned at two sides of said roller and supporting said roller for rotation, one of said eccentrics having a first supporting pin and a first bearing in which said first supporting pin is friction-free supported and rotated, the other of said eccentrics having a second supporting pin having an end rigidly clamped in a machine frame, said one eccentric and the other eccentric being positioned in respect to said roller so that the amount of eccentricity defined therebetween is smaller, equal or not substantially greater than a radius of said roller, said measuring means including a measurement translating lever and a contactless measurement receiver, said lever having one end rigidly connected to said second supporting pin for detecting an elastic twisting thereof proportional to the web tension being measured and a second end cooperating with said receiver, said receiver being adjustably rigidly connectable to the machine frame.

The receiver may be an optoelectronic sensor which detects positions of said second end and includes a light transmitter and a light detector, said second end being mounted to freely move in an optical path between said light transmitter and said light detector.

The device may further include an additional bearing for supporting said second pin for friction-free rotation. Thereby it is provided that a high resistance to bending with a low resistance to twisting would be obtained.

Eccentrics themselves may be cylindrical elements or may additionally include axles inserted in the ends of the roller from the end faces thereof and support the roller on the roller or ball bearings, or may include discs rigidly connected to the cylindrical eccentrics and applied to two opposite ends of the roller.

The measurement translating lever may be formed as any other suitable translating member, for example as a light beam applied to the second supporting pin to detect the amount of the twisting thereof, proportional to the web tension.

The transported web generates, due to web tension and web wrapping about the roller, a torque which results from the resulting force acting in the bearings of the roller and due to the eccentricity between the roller axis and pin axes, the vector of that torque lying along the axis of rotation of the supporting pin, which is elastically twisted. Due to the angular translating lever an increasing twisting angle of the portion of the second pin, non-clamped in the machine frame, which angle is proportional to the web tension being detected, is translated with the factor greater than 1 to the contactless measurement receiver.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a schematic axial sectional view of the device for measuring web tension of a continually movable web according to the invention; and FIG. 2 is a schematic view illustrating an eccentricity between a roller axis and a support axis.

DETAILED DESCRIPTION OF THE PREFERRED EMBODIMENT

Referring now to the drawings in detail, the device for measuring web tension of a continually transported web 15 (FIG. 2) to be printed on, comprises a web guiding roller 5, which is cylindrical, and roller bearings 3, 4 positioned at two opposite sides of the roller to support the latter for rotation on two axles 16 of discs 1 and 2. The axial discs 1 and 2 are rigidly secured to respective eccentrics 6 and 7 by any suitable conventional means. Eccentric 6 is rotationally supported by means of its pin 9 in a friction-free supporting bearing 9. Eccentric 7 is rotationally supported by means of its supporting pin 10 in a friction-free supporting bearing 11 and has an end which is rigidly clamped in a machine frame 12. An angular lever 13 provided in the measuring device of this invention has one arm 13a, the free end of which is applied to and is rigidly connected to the supporting pin 10, and another arm 13b positioned between a light transmitter 14.1 and a light detector 14.2 of an optoelectronic sensor or gage 14 which operates in the conventional fashion and senses a relative position of the arm 13b. Sensor 14 is rigidly supported in the machine frame and its position can be adjusted relative thereto.

Web 15 being transported on the rotating roller 5 generates, due to web tension and web wrapping about the roller, a resulting force F applied to the axis of rotation of the web guiding roller 5 and acting normally thereto. This force F in turn generates, due to a two-side, eccentric support acting perpendicularly to force F, a torque on the eccentrics, the vector of this torque lying in the rotation axes of the eccentrical pins 8 and 10 and elastically twisting the supporting pin 10 the end of which is rigidly clamped in the machine frame 12. A rotation angle with a factor many times greater than 1, proportional to the web tension and increasing along the axis of the portion of pin 10, not rigidly clamped in machine frame 12, is translated by lever 13 to the sensor 14 which optically detects the change in the position of arm 13b and thereby measures the value of the web tension. Bearing 11 serves for higher bending resistance of the supporting pin 10.

Specifically advantageous for the measuring device of the present invention is its specific rigidity. Further advantages of the invention reside in the fact that inertia-free and feedback-free measurements result. Defects in the axes between eccentrics 6 and 7 and an eccentric rotation axis also favorably affect the conditions of the printing machine (web introduction).

In FIG. 2 "e" is the eccentricity between the axis of supporting pin 8 and the rotation axis of the web guiding roller 5. The amount of this eccentricity is according to the invention smaller, equal or not essentially greater than radius R of the roller 5.

It will be understood that each of the elements described above, or two or more together, may also find a useful application in other types of devices for measuring web tension of continually transported material webs differing from the types described above.

While the invention has been illustrated and described as embodied in a device for measuring web tension of continually transported material web, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for measuring web tension of a continually transported material web engaged with and moved on an outer surface of a web guiding roller, comprising means for supporting said roller for rotation; and measuring means connected to said supporting means and measuring the web tension, said supporting means including two eccentrics positioned at two sides of said roller and supporting said roller for rotation, one of said eccentrics having a first supporting pin and a first bearing in which said first supporting pin is friction-free supported and rotated, the other of said eccentrics having a second supporting pin having an end rigidly clamped in a machine frame, said one eccentric and the other eccentric being positioned in respect to said roller so that the amount of eccentricity defined therebetween is smaller, equal or not substantially greater than a radius of said roller, said measuring means including a measurement translating lever and a contactless measurement receiver, said lever having one end rigidly connected to said second supporting pin for detecting an elastic twisting thereof proportional to the web tension being measured, and a second end cooperating with said receiver, said receiver being adjustably rigidly connectable to the machine frame.

2. The device as defined in claim 1, wherein said receiver is an optoelectronic sensor which detects positions of said second end and includes a light transmitter and a light detector, said second end being mounted to freely move in an optical path between said light transmitter and said light detector.

3. The device as defined in claim 1, further including an additional bearing for supporting said second pin for friction-free rotation.

4. The device as defined in claim 1, wherein each of said eccentrics includes an axle inserted into a respective end of said roller.

5. The device as defined in claim 1, wherein each of said eccentrics includes a disc connected to a respective end of said roller.

* * * * *